INVENTOR
HANS STERN

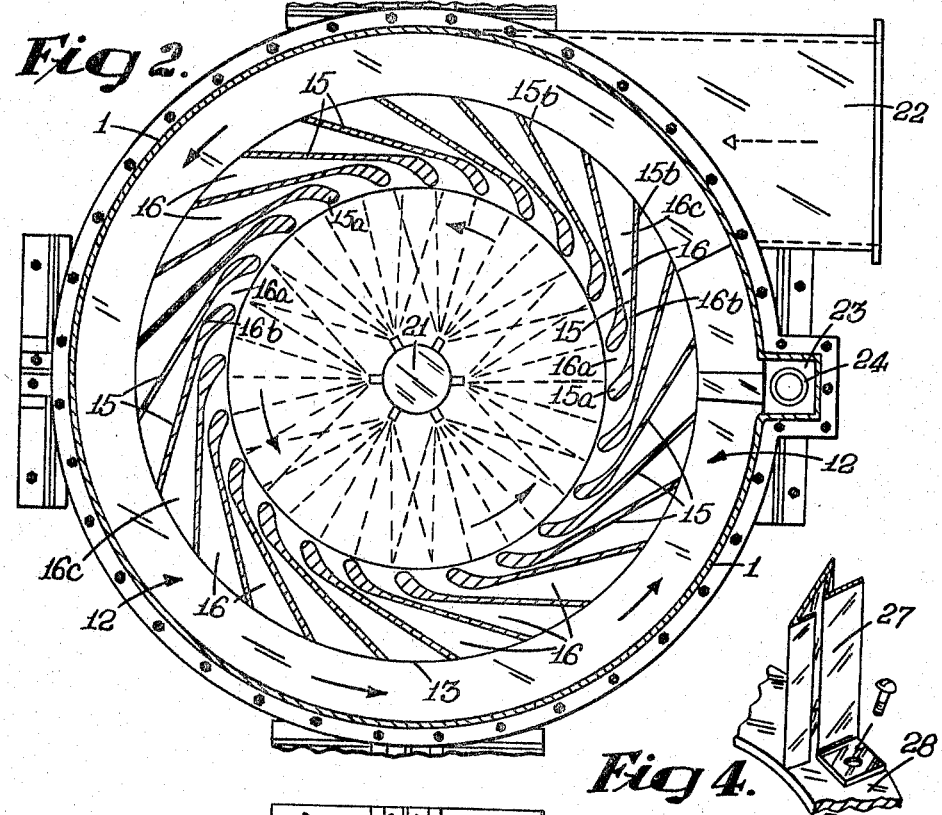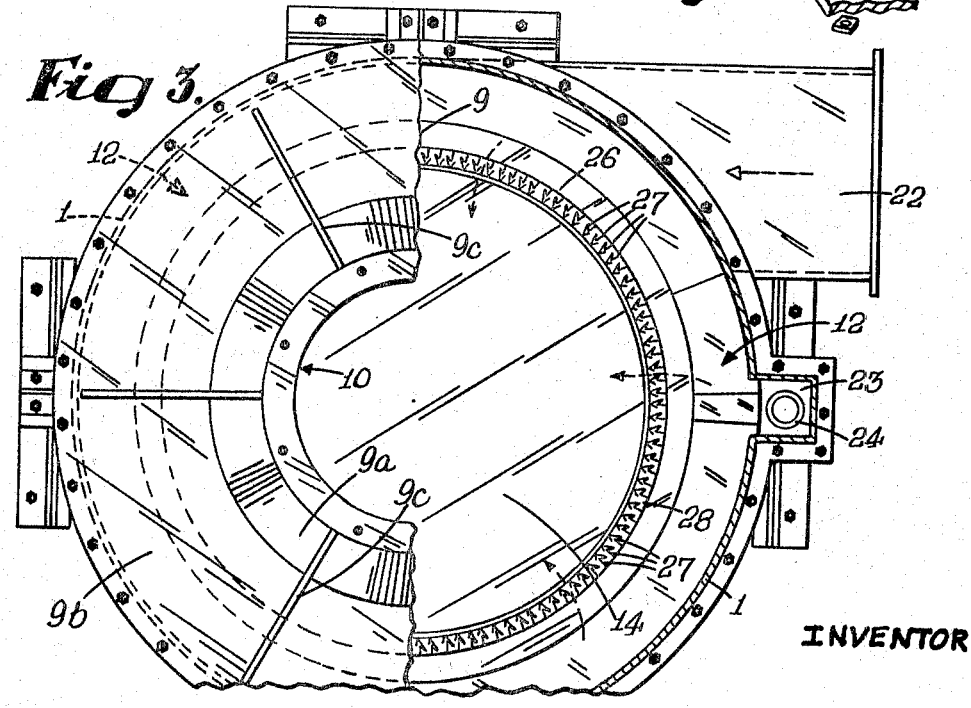

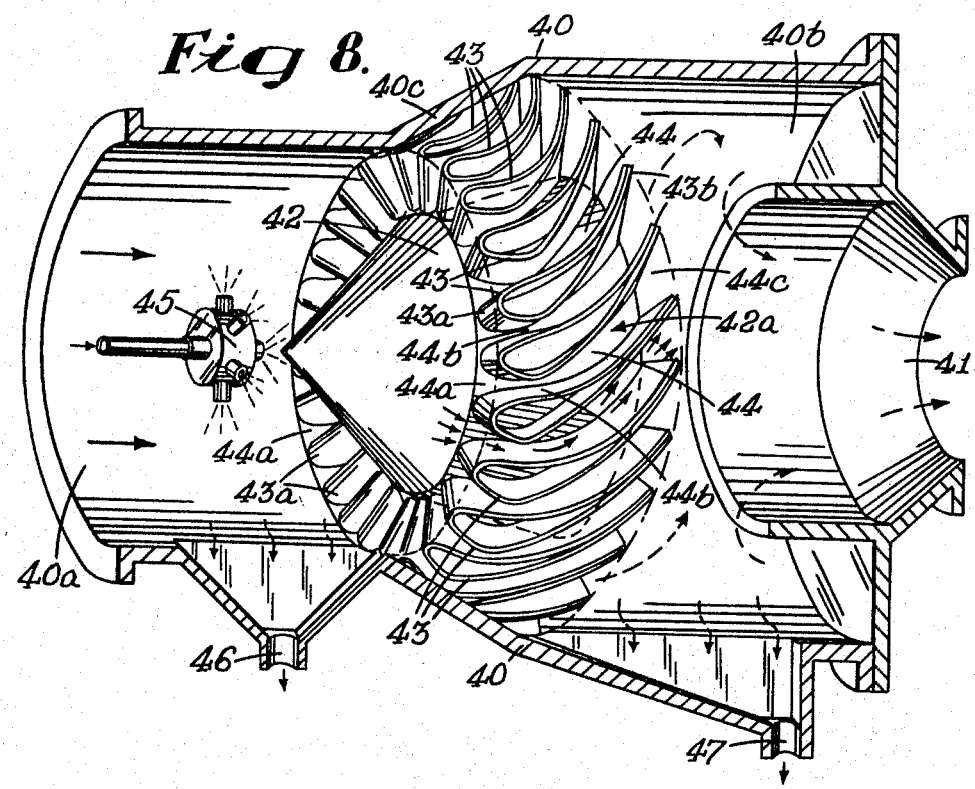
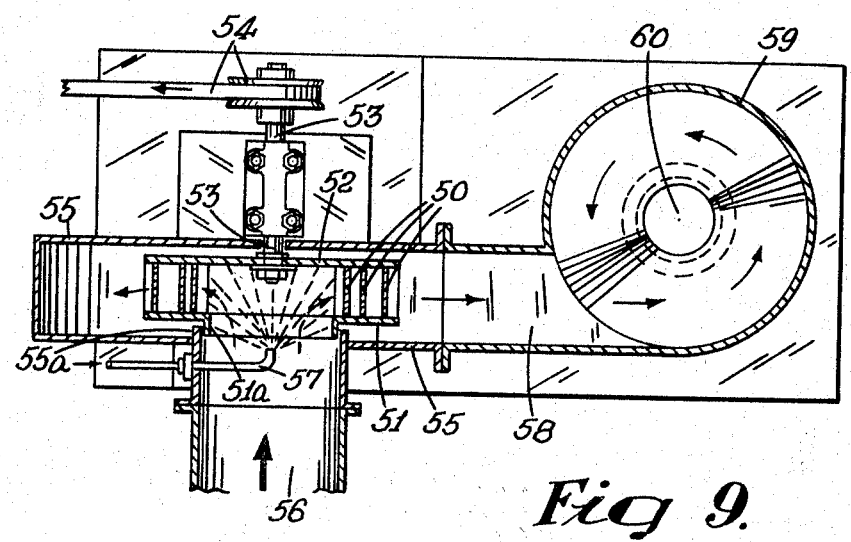

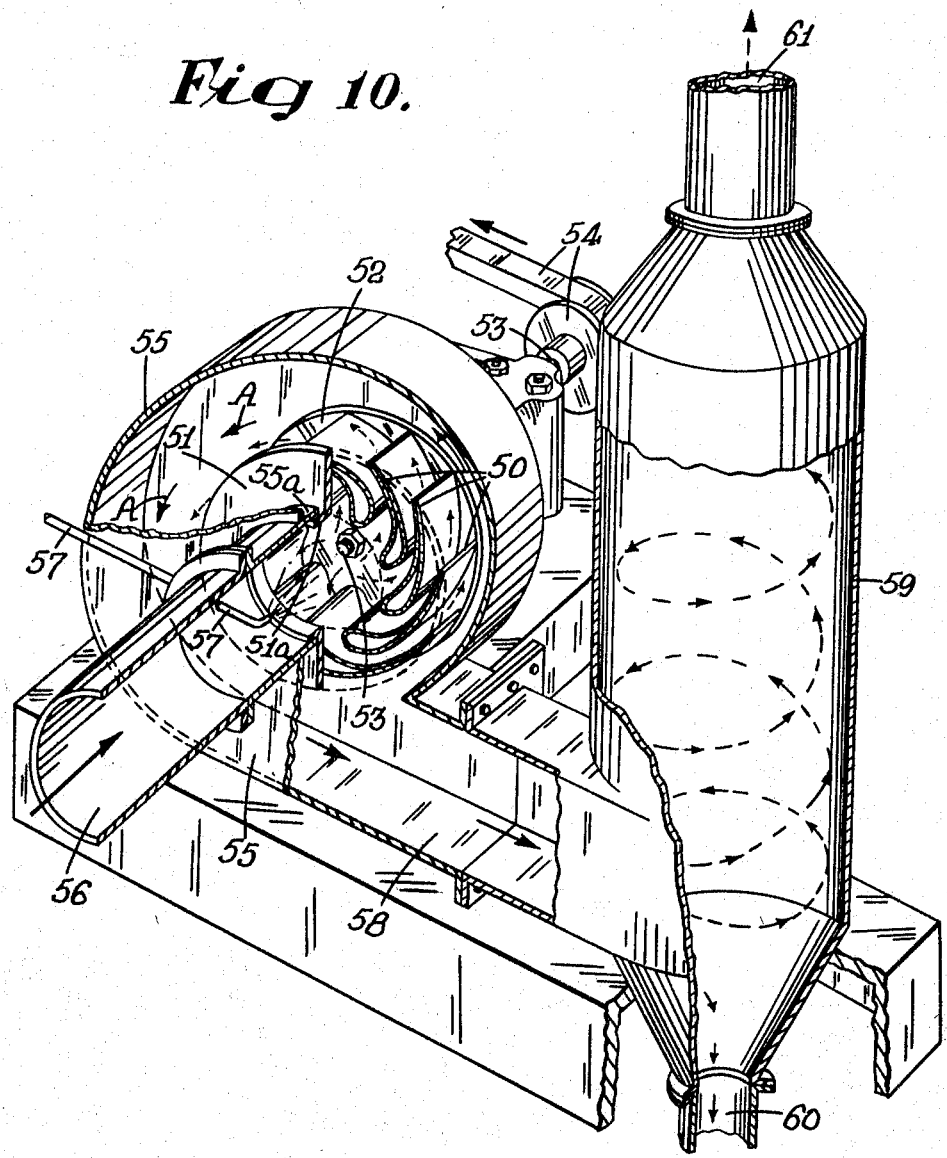

United States Patent Office 3,323,290
Patented June 6, 1967

3,323,290
METHODS OF AND MEANS FOR THE
SCRUBBING OF GASES
Hans Stern, 17 Morris Crescent, Selection Park, Springs,
Transvaal, Republic of South Africa
Filed Oct. 20, 1964, Ser. No. 405,296
Claims priority, application Republic of South Africa,
Oct. 23, 1963, 63/4,811
20 Claims. (Cl. 55—92)

This invention relates to a method of and apparatus for scrubbing a gas stream contaminated with solid and/or liquid particulate matter in suspension.

More particularly the invention is concerned with venturi-type gas scrubbing.

It is known to scrub gases by contacting them with a mist or atomised liquid particles and then urging the mixture through a throat of venturi pattern. The high velocity of the gas as it passes through the venturi has the effect of forming agglomerates of the contaminants and liquid particles and the agglomerates are subsequently separated from the gas stream, for example by cyclonic separation. In another type of separation which has been proposed the gas stream carrying the agglomerates is made to impinge on a suitable surface so that the agglomerates are trapped and a cleansed gas is obtained.

Known types of venturi scrubbers have employed a bank or multiplicity of venturi throats arranged in line or linearly, the throats defining paths for gas streams, which paths are also linear or unidirectional. Venturi type gas scrubber arrangements of the above kind have relatively high overall resistance or pressure loss and correspondingly high power requirements.

Furthermore the arrangements heretofore used have, where liquid spraying is carried out in front of the venturi throats, involved difficulties in obtaining an even spray over the whole arrangement and the contact between the gas liquid particles is consequently uneven resulting in reduced efficiency of the scrubber.

It is an object of the invention to provide a novel venturi-type method of and apparatus for scrubbing gases which give high efficiency of separation coupled with relatively low power requirements.

It is a further object of the invention to provide an arrangement in which contact between the gas and liquid particles will be improved.

According to the invention a method of scrubbing a gas contaminated wtih particulate matter in suspension comprises subjecting the gas to an agglomeration stage in which the gas is contacted with a liquid and agglomerates of contaminant and liquid particles are formed, and thereafter subjecting the gas to a separation stage in which at least some of the agglomerates are removed therefrom, said agglomeration stage including the steps of passing the gas in a stream along a path defined by an accelerating zone followed by a decelerating zone, and being characterised in that the path is bent whereby particulate matter in the gas is subjected to the action of centrifugal force in the path.

The path may have any suitable cross-sectional shape, for example circular or polygonal. Furthermore, the path could be curved over its entire length or alternatively a relatively sharp bend or curve could be provided anywhere along its length, the most important consideration being that the direction of the path be changed for the purpose of ensuring a centrifugal action on particles in the gas stream. Thus the term "bent" is intended to encompass any path shape which will give rise to such forces on the particles. In general it is the medial line along the path which is bent. In addition to the normal agglomeration effect of the venturi throat, further agglom- erating effect is caused in the path due to the particles being thrown outwardly under centrifugal force against the wall of the path and the maximum effect of such additional agglomeration is experienced when the gas is moving at high velocity. For this reason the bend is preferably located in the path where the velocity of the gas is at its highest.

Further according to the invention, therefore, the path is bent in the zone of maximum velocity of the gas stream in the path.

The liquid used for scrubbing purposes is generally water which can be atomised for contact with the gas just before it enters the accelerating zone of the path or can be introduced anywhere into the path so long as the walls of the latter are well irrigated.

Also according to the invention the agglomeration stage includes the steps of dividing the gas into a plurality of streams and passing each stream along a path as defined above, the paths being circumferentially spaced about and equidistant from an axis.

In the preferred method of the invention the gas is subjected to two separation stages of a cyclonic nature, one before and one after the agglomeration stage, the gas from the first separation stage flowing directly from the cyclone into the paths and from the latter directly into the second cyclone.

The invention also includes within its scope gas scrubbing apparatus, useful in the removal of particulate contaminants from a gas, including means providing an agglomeration chamber in which agglomerates of contaminant and liquid particles are formed, said chamber comprising a passage for gases defining a converging zone followed by a diverging zone, the apparatus being characterised in that the medial line along the passage is bent.

Further aspects of both the method and apparatus according to the invention will become apparent from the following description with reference to the accompanying drawings in which:

FIGURE 2 is a cross-section taken on the line II—II in FIGURE 1;

FIGURE 3 is a part plan and a part cross-section taken on the line III—III in FIGURE 1;

FIGURE 4 is a detail in perspective of part of the apparatus illustrated in FIGURES 1 and 3;

FIGURE 8 is a view partly in perspective and partly in longitudinal section of yet a further alternative form of gas scrubber apparatus according to the invention.

FIGURE 9 is a cross-section through another form of gas scrubber apparatus according to the invention; and FIGURE 10 is a view partly in perspective and partly in vertical section through the apparatus of FIGURE 9.

Figure 1:
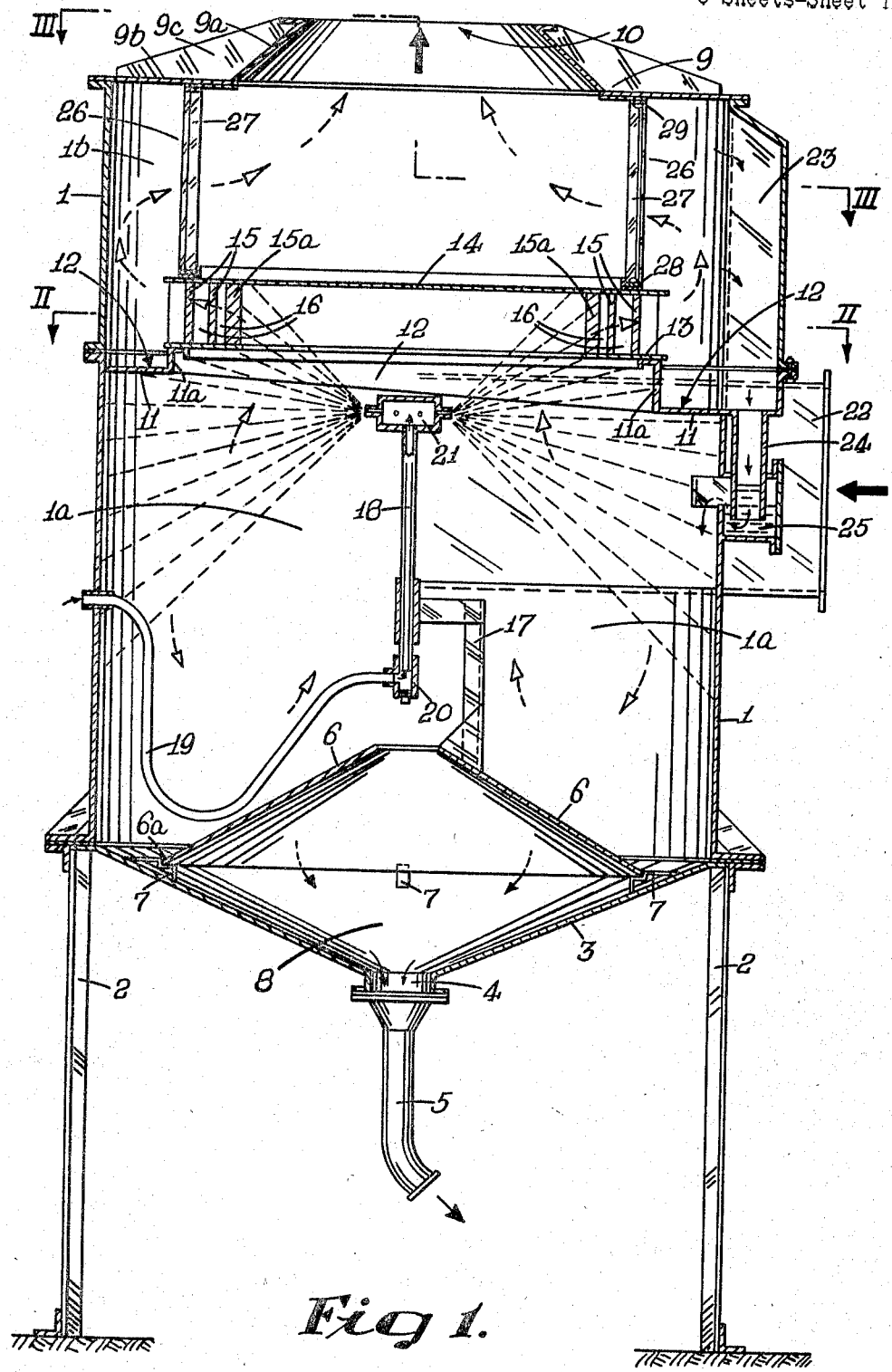
FIGURE 1 is a vertical section through gas scrubber apparatus according to the invention.

Referring now to FIGURES 1 to 4 of the drawings, a cylindrical casing 1 having a vertical axis is mounted on legs 2 and is provided with a downwardly directed conical base 3 at the apex of which is port 4 which communicates with a discharge line 5.

A diaphragm 6 also of conical shape is oppositely directed to the base 3 so that it projects into the casing 1, the diaphragm being mounted around the periphery of its base 6a on brackets 7, the arrangement providing communication between the interior of the casing 1 and a space 8 defined between the case 3 and diaphragm 6.

At the upper end of the casing 1 is a cover 9 comprising a conical zone 9a having a flange 9b and provided with strengthening ribs 9c, the conical zone defining an outlet 10 for the casing 1. A gas feed 22 leads tangentially into the casing 1 and the latter therefore constitutes a cyclone chamber.

Intermediate the base 3 and cover 9 and just above the gas feed 22 is an annular angle section plate 11 which is fast with the internal surface of the casing 1 so that an annular sludge trough 12 is provided between the rim 11a, angle plate 11 and the casing 1. The base of angle plate 11 slopes downwardly from left to right as viewed in FIGURE 1 so that the trough 12 slopes accordingly.

On the rim 11a rests a venturi ring construction comprising a lower annular plate 13 and an upper circular cover plate 14 spaced therefrom, the annular and cover plates 13 and 14 being of equal diameter and co-axial with the casing 1. In the gap between the plates 13 and 14 is a series of axially extending congruent vanes 15 which are arranged in overlapping ring formation about the axis of the casing 1, i.e. equidistant therefrom, the vanes being also equally spaced apart in a circumferential sense so that a plurality of similar passages 16 is defined between adjacent vanes 15. As can be seen from FIGURE 2, each vane includes a head part 15a and a tail part 15b, such head parts 15a being of aerofoil shape so that they present as little resistance to air or gas flow as posible. In addition the axes of the vanes 15 are curved over the head parts 15a and are so arranged that the passages 16 are of venturi shape, i.e. they define an outwardly converging zone 16a between the heads 15a followed by a throat zone 16b of constant cross-sectional area and a diverging zone 16c between the tails 15b. As a consequence of the shape and positioning of the vanes 15, the medial lines of the passages 16 are curved over the converging and throat zones 16a and 16b respectively, a maximum degree of curvature occuring in or close to the zone 16b. Furthermore, the passages 16 are such that the medial lines thereof in the zones 16c are substantially parallel to tangents to the casing 1. Preferably the vanes 15 are secured to the lower and upper plates 13 and 14 so that the venturi ring construction comprises an integral assembly which can be secured to the annular plate 11 on its rim 11a. The plates 13 and 14 are of smaller diameter than the casing 1 and since the vanes 15 are located wholly within the gap between these plates an annular space is left between the venturi ring construction and the internal surface of the casing 1.

It will be appreciated that the venturi ring together with the plate 11 provide a separator dividing the casing into a lower feed zone 1a and an upper separator zone 1b which communicate only through the passages 16.

In the feed zone 1a of the casing 1 is a bracket 17, mounted on the diaphragm 6, fast with which bracket is an axially extending pipe 18 into which water is fed through a supply line 19 connected to the pipe 18 by a coupling 20. At the upper end of the pipe 18 an atomiser 21 is provided which is located just below the annular plate 13 so that spray therefrom is directed evenly over the entrances to the passages 16.

The wall of the casing 1 in the separator zone 1b defines a vertical sludge channel 23 leading downwardly into a downcomer 24 discharging into a liquid trap 25 and the sludge trough 12 is arranged to discharge into the downcomer 24. Overflow from the liquid trap 25 discharges into the feed zone 1a of the casing and the differential head of liquid in the downcomer 24 and liquid trap 25 is a measure of the pressure difference in the feed and separator zones 1a and 1b respectively.

Also located in the separator zone 1b is an eliminator ring 26 of known construction. Such eliminator ring includes a series of spaced blades 27 mounted between axially spaced rings 28 and 29. The blades 27 are shaped to provide outwardly opening double sludge traps of V-shaped cross-section which act to trap sludge in gases passing inwardly through the spaces between the blades 27.

In operation a gas stream, for example air which is contaminated with particles such as dust or the like suspended in the air, is introduced tangentially into the feed zone 1a via the gas feed 22 so that a cyclonic mass is set up, the action of the cyclone being enhanced by the diaphragm 6. Due to the cyclone action in the feed zone 1a a preliminary separation from the air of particles in the range 26 microns and up is obtained and the separated particles, which are trapped in water issuing from the atomiser 21, are removed from the zone 1a of the cyclone chamber in the form of sludge via the discharge line 5.

Smaller particles of a size less than 26 microns together with water particles, which, as stated above, are sprayed evenly over the entrances to the passages 16, are carried by the air upwardly through the angle section plate 11 and the whirling mass then divides into a plurality of streams which move in paths defined by the passages 16. The gas streams pass substantially tangentially outwardly from the zone 1a into the zone 16a of the passages 16 and thereafter substantially tangentially into the zone 1b on leaving the zones 16c of the passages 16.

The gas streams are first accelerated as they move along the converging zones 16a of the passages 16, thereafter the streams move at constant high velocity along the passage zones 16b and finally the streams are decelerated in the passage diverging zones 16c before entering substantially tangentially into the casing zone 1b. During movement of the gas streams along the passages 16 agglomerates of contaminant and liquid particles are formed, particularly in the zones 16b where the streams are travelling at highest velocity. The passages thus act in the nature of agglomeration chambers. Such agglomerating effect is enhanced by the curved form of the passages and this is believed to be due to the fact that as the direction of the gas streams is changed in negotiating the curve, particles carried by the streams are subject to considerable forces due to centrifugal action. These forces, it is believed, throw the particles radially outwardly with respect to the curved passages and an additional agglomerating effect occurs against the outer curved surfaces defining the passages. It is further believed that such agglomerating effect is at least in part a consequence of penetration and trapping of contaminant particles in a liquid film formed on the outer curved surfaces of the passages and this explanation is apparently substantiated by the fact that little abrasion occurs to the surfaces defining the passages 16 particularly where abrasion is most likely to occur, namely in the curved zones 16a and particularly 16b. As will be described below, the action of the forces due to centrifugal action increases directly with the square of the speed of the gas stream and for this reason it is preferred to have a direction change in the passage, such as by the curve provided, where the gases are moving at the highest velocity. However, it is not contrary to the invention to curve the passages 16 elsewhere or in addition to the zones of maximum velocity as will be described hereunder.

On leaving the passages 16 the gas streams are merged into a single cyclonic mass in the separator zone 1b of the casing and the agglomerates are thrown outwardly against the wall of the casing 1 where they are caught in the vertical sludge channel 23 and also run down into the sludge trough 12 from where the contaminants in the form of sludge run down to the downcomer 24 into the trap 25 and eventually overflow into the zone 1a and out via the discharge line 5. In addition, the gas passes through the eliminator ring blades 27 where further sludge is removed therefrom and cleansed gases leave the casing 1 through the outlet 10.

In an example of the operation of the above apparatus the following data apply:

| | | |
|---|---|---|
| Casing diameter | feet | 5 |
| Venturi ring outside diameter | do | 4 |
| Venturi ring inside diameter | do | 3 |
| Number of vanes and venturi passages | | 24 |
| Sum of cross-sectional area of all venturi throats | feet² | 0.5 |
| Angle of convergence of accelerating zones of venturi passages | degrees | 30 |
| Angle of divergence of decelerating zones of venturi passages | do | 15 |
| Length of venturi passages | inches | 16 |
| Length of converging zone of venturi passages | do | 3 |
| Length of diverging zone of venturi passages | do | 12 |
| Radius of curvature of venturi throats | do | 4 |
| Volume of gas feed | feet³/minute | 7000 |
| Loading of contaminants in gas feed | mg./feet³ | 127 |
| Mean particle size of contaminants in gas feed (measured by permeability method) | microns | 5 |
| Mean particle size of contaminants in exit gas | do | 1.7 |
| Water fed through atomiser | gallons/minute | 2.5 |
| Number of spray nozzles of atomiser | | 6 |
| Pressure difference over apparatus | inches of water | 4.5 |
| Pressure difference across venturi ring only | do | 2.25 |

With the above apparatus and under the conditions specified it was found that air leaving the cyclone contained 2 mg./feet³ of contaminants, i.e. overall 98.5% of the contaminants were removed by the apparatus with a theoretical air horse-power consumption of only $$\frac{4.5 \times 7000 \times 5.2}{33,000} \text{ H.P.} = 4.95 \text{ H.P.}$$

As stated above, it is believed that centrifugal forces play an important part in obtaining efficient scrubbing of gases in the apparatus of the invention and the forces to which the particles are subjected in the gas stream in the throat zones of the passages can be calculated as follows:

$$\text{Force} = \frac{mV^2}{R}$$

where $m$=mass of a particle; $V$=velocity of particle, i.e. velocity of gas stream; and $R$=radius of curvature of path of particle (mean path being taken).

In the example considered above therefore:

$$\text{Volume of gas feed} = \frac{7000}{60} \text{ feet}^3/\text{sec.}$$

$$= 116.7 \text{ feet}^3/\text{sec.}$$

$$\therefore \text{Velocity of gas stream} = \frac{116.7}{.5} \text{ feet/sec.}$$

$$= 233 \text{ feet/sec.}$$

$$\therefore \text{Force} = m \frac{233^2}{.33} \text{ foot-lbs./sec.}^2$$

$$= m 164,400 \text{ foot-lbs./sec.}^2$$

When one considers the forces due to gravity of $mA$, where $m$=mass and $A$=acceleration, force=$m32.2$ foot-lbs./sec.², ∴ the force on the particles due to centrifugal action in changing the direction of the passages, i.e. by curving the passages will be 5100 times larger than gravitational forces.

In the light of the above it will be seen that it is important to provide high velocities in the throat zones 16b of the passages and also to curve the passages in such throat zones to the maximum degree possible whilst still retaining relatively small resistance to the flow of gases therein.

Figure 5:
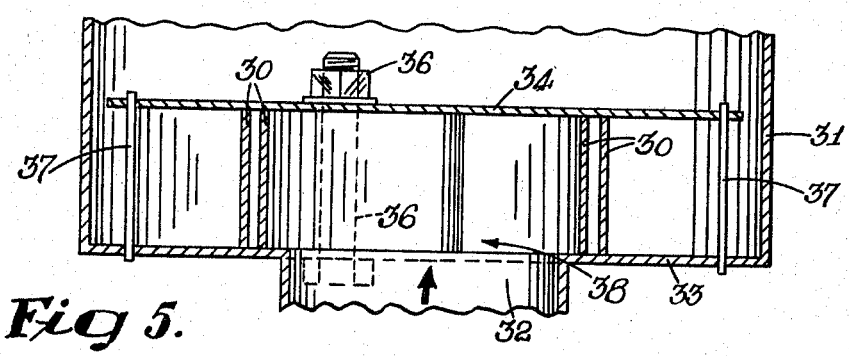
FIGURE 5 is a vertical section through part of an alternative form of gas scrubber apparatus according to the invention, the section being taken on the line V—V in FIGURE 6.
Figure 6:
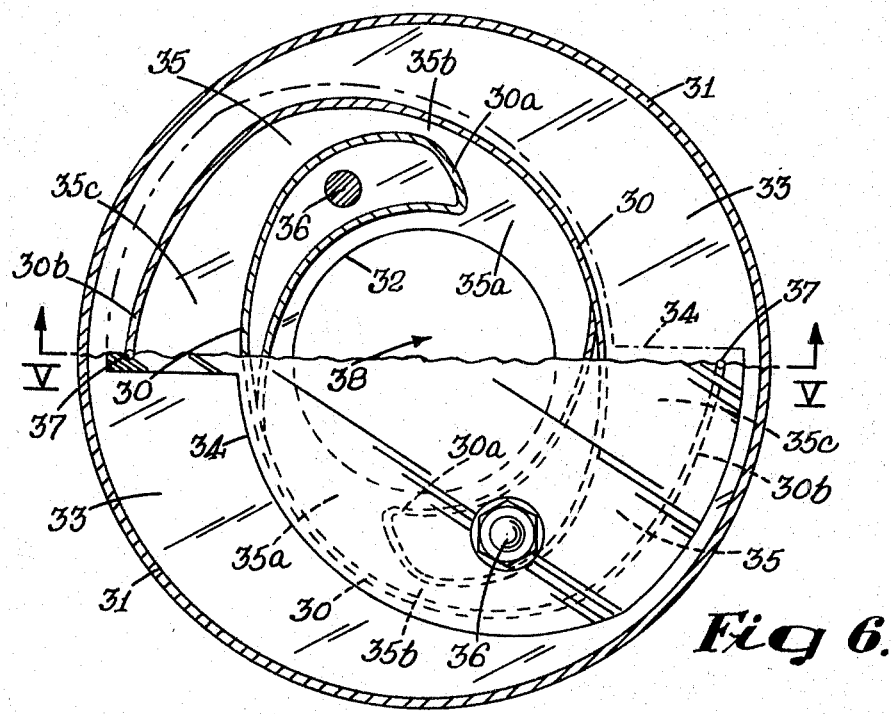
FIGURE 6 is a view of the apparatus of FIGURE 5 partly in plan and partly in cross-section.
Figure 7:
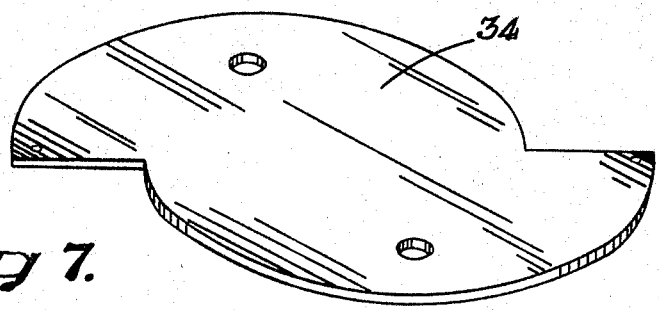
FIGURE 7 is a perspective view of a cover plate forming part of the apparatus of FIGURES 5 and 6.

Referring now to FIGURES 5 to 7, an alternative form of gas scrubbing apparatus according to the invention is illustrated which in essence is similar to that described above. In this case, however, only two vanes 30 are provided in a casing 31 provided with an axial inlet 32 for feed gases. The vanes 30 are constructed of folded sheet metal to provide head and tail parts 30a and 30b respective as in the prior case, but in this instance the vanes 30 are curved over their whole lengths. These vanes 30 are axially extending in the casing 31 and are located between the base 33 of the latter and a cover 34 so that similar passages 35 are defined between them, each passage including outwardly converging, constant volume and diverging zones 35a, 35b and 35c respectively defined between the head 30a of one vane and the tail 30b of the other.

Each vane is secured in position by means of a bolt and nut 36 passing through the head parts 30a, the head of the bolt engaging under the base 33 of the casing and the nut bearing against the upper surface of the cover 34. Also the ends of the tails 30b are fixed in position by pins 37 which permit pivotal movement of the vanes 30. Thus should variation of the shape of the passages 35 be required the bolt and nut assembly is loosened to permit adjustment of the vanes 30 after which the latter are once again clamped fast.

In operation this apparatus is similar to the first described apparatus and suitable means (not illustrated) may be provided in the base of the casing 31 or vertically spaced from the vanes 30 to remove agglomerates formed in the passages 35. As in the previous case, water can be sprayed into the space 38 between the vanes 30 for contact with feed gases directed axially into this space, but, alternatively or in addition, water may be injected into the passages 35 themselves by means of suitable nozzles (not shown). Although a plurality of passages 35 is provided in the apparatus of FIGURES 5 to 7, one passage only may be employed by a suitable alteration of the design of the equipment without departing from the nature of the invention. In this apparatus the passages 35 are, by virtue of the shape of the vanes 30, curved over their entire lengths thereby providing a properly tangential outlet for gases from the diverging zones 35c, but the curved nature of the passages is essential only in or close to zone 35b where the velocity of the gas stream is extremely high.

Referring to FIGURE 8, the gas scrubbing apparatus there illustrated includes a casing 40 adapted for use in a condition in which its axis is horizontally disposed. The casing includes a gas feed inlet 40a and a separator zone 40b which constitutes a cyclone chamber provided with an axial outlet 41 for cleansed gases. A flared part 40c connects the inlet 40a to the separator zone 40b and in the casing there is located a truncated cone 42 positioned to provide substantially radially spaced opposed surfaces defined by the flared casing part 40c and the trunk 42a of the truncated cone 42.

In the space between the abovementioned opposed surfaces there is located a series of vanes 43 constructed of folded sheet metal to provide head parts 43a and tails 43b. These vanes are radially extending and equally spaced apart in a circumferential sense about the axis of the casing to provide a series of passages 44 which include converging and constant cross-sectional zones 44a and 44b respectively between the heads 43a and diverging zones 44c between the tails 43b. In addition, the vanes 43 are curved and so positioned that the passages in turn are curved along their entire lengths, a maximum degree of curvature occurring in the zones 44b of such passages. Furthermore, whilst the inlets to the passages 44, namely the entrances to the converging zones 44a, are axially directed, the exits from the passages are transverse the axis so that gas leaving the passages and entering the cyclone chamber 40b assumes a cyclonic motion.

In operation contaminated gas passes axially along the gas feed 40a where it picks up small water particles produced by an atomiser 45, excess water escaping through an outlet 46 provided with a suitable trap (not shown) to prevent the escape of gas. Thereafter the mass divides into a series of streams which pass along paths defined by the passages 44 and these streams are subjected to the same action in the passages as was described with reference to FIGURES 1 to 4 so that agglomerates of contaminant and liquid particles are formed. These agglomerates migrate outwardly due to cyclonic action in the cyclone chamber or separator zone 40b and ultimately escape via sludge outlet 47 whilst cleansed gases pass out of the casing 40 through outlet 41.

In further apparatus falling within the scope of the invention and illustrated in FIGURES 9 and 10, a venturi ring construction substantially similar to that described with reference to FIGURES 1 to 4 is provided. In the present case, however, the vanes 50 are curved over their entire lengths and are constructed of folded sheet metal in much the same fashion as described with reference to FIGURE 8.

The venturi ring includes spaced annular and circular plates 51 and 52 respectively, and the latter is coupled to a prime mover (not shown) through shaft 53 and belt and pulley 54. The prime mover drives the venturi ring about its own horizontal axis in the direction of arrows A, a running seal for the venturi ring being provided by a flange 51a, on the annular plate 51, which engages in an orifice provided in a wall 55a of a casing 55 in which the venturi ring is located.

A gas feed duct 56 delivers contaminated gas axially into the venturi ring and on the way the gas picks up droplets of water introduced into the duct by means of a line 57 at the end of which is a suitable nozzle. It will be appreciated, of course, that the water could, if desired, be introduced directly into the passage between the vanes 50 by the use of a plurality of nozzles projecting into such passages. In the venturi ring the gas passes radially into rotating passages defined between the vanes 50 where, for the same reasons as stated above, agglomeration of contaminant and liquid particles occurs. The action of centrifugal force on particles in the gas stream, due to changing the direction of the paths of the gas stream by bending the passages, is assisted by the rotation of the venturi ring in the direction shown by the coriolis forces and centrifugal forces due to the venturi ring rotation. Rotation of the venturi ring in the opposite direction in the arrangement illustrated, however, would have an effect of minimising the forces imposed on the particles.

After leaving the passages the mixture of gas and agglomerated particles passes out of the casing 55 via a duct 58 and tangentially into a cyclone chamber 59. In the latter agglomerates discharge through the lower outlet 60 and cleansed gases leave via outlet 61.

As mentioned above, the coriolis and centrifugal forces, due to rotation of the venturi ring in the direction shown, assist the action of the curved passages between the vanes 50.

The coriolis force may be calculated as:
$$\text{Force} = m.2wV$$

where $m$ = mass of a particle; $w$ = angular velocity of rotation; and $V$ = velocity of particles relative to path walls.

The centrifugal force due to venturi ring rotation may be calculated as:
$$\text{Force} = m.w^2 r$$

where $m$ and $w$ are as defined above and $r$ = radius of rotation of particle.

Thus for the same apparatus for which an example was given above the total force to which the particles are subjected at a point in the zone of maximum velocity on the gases in the passages is the vector sum of the three forces.

By suitable design of the vanes, rotation of the venturi ring could induce the latter to act as a fan whereby air flows through the passages at sufficient force and intensity to overcome the external resistance as well as the internal resistance to such flow.

Whilst the above examples of gas scrubbing apparatus illustrate curved vanes and curved passages for gas streams, it will be appreciated that a sharp bend could replace a curve in such passages for the purpose of effecting a direction change thereof. It is not considered, however, that a sharp bend will be as effective as a curve since undue resistances to gas flow are likely to be set up.

I claim:
1. A method of scrubbing a gas contaminated with particulate matter in suspension, the method comprising the steps of:
   I. subjecting the gas to an agglomeration stage in which the gas is contacted with a liquid and agglomerates of the contaminate and the liquid particles are formed, the agglomeration stage including the steps of:
      (a) dividing the gas into a plurality of streams;
      (b) passing each stream along a venturi-shaped path defined between spaced vanes whereby the streams are subjected to acceleration followed by deceleration;
         the paths being characterized by circumferential spacing about and equidistant spacing from an axis;
      (c) the paths being bent by virtue of the configuration of the vanes to cause particulate matter in the gas stream to be subjected to the action of centrifugal force in the paths to be urged into engagement with the vanes; and
   II. thereafter subjecting the gas to a separation stage in which at least some of the agglomerates are removed therefrom.
2. The method of claim 1 in which the paths radiate outwardly with respect to the axis.
3. The method of claim 1 in which the paths extend longitudinally with respect to the axis.
4. The method of claim 1 in which the paths are bent in the zone of maximum velocity of the gas streams in the paths.
5. The method of claim 1 in which liquid is introduced into the paths in the zone of maximum velocity of the gas streams in the paths.
6. The method of claim 1 in which the gas is contacted with a liquid prior to being accelerated in the paths.
7. The method of claim 1 in which the gas is passed from the deceleration zones of the paths directly and substantially tangentially into a chamber of substantially circular cross-section to form a cyclonic mass of the gas leaving the paths.
8. A gas scrubbing apparatus for use in a method of gas scrubbing for gas contaminated with particulate matter and involving agglomeration and separation stages, the apparatus comprising:
   a plurality of bent vanes arranged about an axis in spaced relationship to provide a series of venturi-shaped agglomeration passages between the vanes defining converging zones followed by diverging zones; the passages including bent medial lines;
   means for urging a contaminated gas through the passages;
   means to contact the gas with a water spray in said passages to form agglomerates of contaminate and liquid particles in the passages; and
   means, involving cyclone action, to separate at least a part of the agglomerates from the gas leaving the passages.
9. Apparatus as claimed in claim 8 in which the passages radiate outwardly with respect to the axis.
10. Apparatus as claimed in claim 8 in which the passages extend longitudinally with respect to the axis.
11. Apparatus as claimed in claim 8 in which the medial lines along the passages are bent in a zone of minimum cross-sectional area of the passages.

12. Apparatus as claimed in claim 8 in which the agglomeration passages are associated with a cyclone chamber and discharge gas directly and substantially tangentially into the cyclone chamber.

13. Apparatus as claimed in claim 8 in which the vanes are disposed in planes parallel to the axis and are located between axially spaced closure members, the vanes being arranged about and equally spaced from the axis and providing at their radially inner ends, openings to the agglomeration passages and at their radially outer ends outlets from the agglomeration passages, the vanes and the closure members being located in a casing and dividing the casing into a cyclone chamber into which the agglomeration passages discharge gas directly and substantially tangentially, and a feed chamber from which gas is fed into the agglomeration passages.

14. Apparatus as claimed in claim 13 including an atomizer adapted to project liquid particles into an inlet zone for the agglomeration passages.

15. Apparatus as claimed in claim 13 in which the vanes are adjustable relative to one another.

16. Apparatus as claimed in claim 8 in which the vanes include a head part and a tail, the head having an enlarged cross-sectional area with respect to the tail and the medial line of the vanes being curved in the zone of the head parts.

17. Apparatus as claimed in claim 16 in which the head parts of the vanes are concavo-convex and of aerofoil shape.

18. Apparatus as claimed in claim 17 in which the converging zones of the passages are defined between the head parts of the adjacent vanes and the diverging zones are defined between the tails of the vanes.

19. Apparatus as claimed in claim 8 in which the vanes are disposed in substantially radially extending planes with respect to the axis and are located between radially spaced closure members, the vanes being arranged about and equally spaced from the axis.

20. Apparatus as claimed in claim 8 in which the vanes providing the agglomeration passages between them are adapted for rotation about the axis.

References Cited

UNITED STATES PATENTS

| | | | |
|---|---|---|---|
| 1,591,147 | 7/1926 | Wales | 55—453 |
| 1,783,813 | 12/1930 | Schneible | 55—238 |
| 1,980,522 | 11/1934 | Hawley | 55—223 |
| 2,004,467 | 6/1935 | Hawley | 55—92 |
| 2,213,881 | 9/1940 | Lauer | 55—223 |
| 2,246,994 | 6/1941 | Herbster | 55—445 X |
| 2,575,359 | 11/1951 | Ortgies | 55—223 |
| 3,216,182 | 11/1965 | Cochran et al. | 55—461 X |

REUBEN FRIEDMAN, *Primary Examiner.*

J. W. ADEE, *Assistant Examiner.*